UNITED STATES PATENT OFFICE.

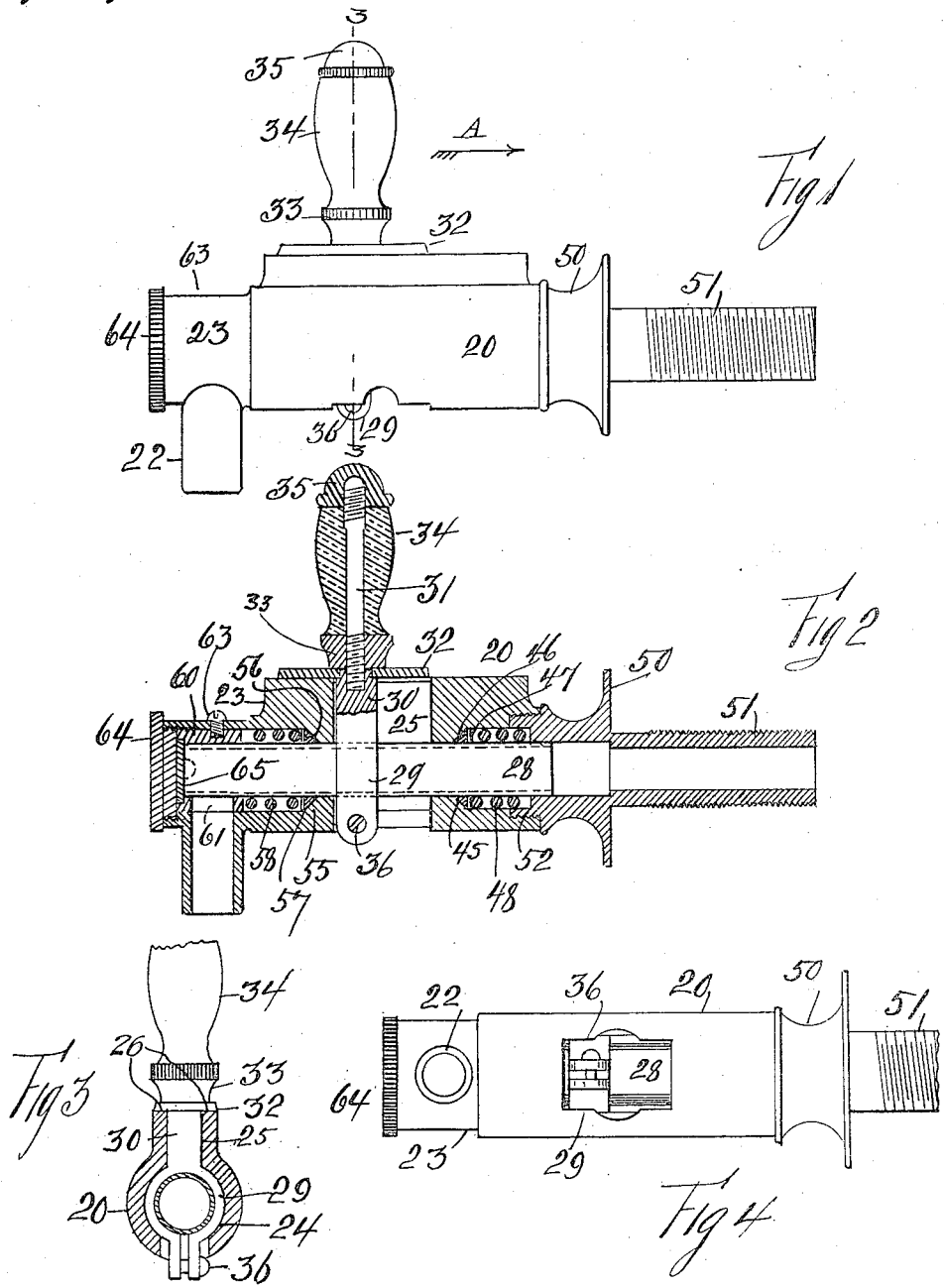

HARRY E. SCHEID, OF JERSEY CITY, NEW JERSEY.

FAUCET.

1,259,298.

Specification of Letters Patent.  Patented Mar. 12, 1918.

Application filed November 27, 1915. Serial No. 63,744.

*To all whom it may concern:*

Be it known that I, HARRY E. SCHEID, a citizen of the United States, and a resident of Jersey City, in the county of Hudson and State of New Jersey, have invented certain new and useful Improvements in Faucets, of which the following is a specification.

This invention relates to a faucet, and specifically relates to a faucet for drawing liquids, like beer, under pressure.

In the accompanying drawings Figure 1 shows a side elevation of the invention; Fig. 2 represents a partial axial longitudinal section of Fig. 1; Fig. 3 is a section of Fig. 1 on the line 3, 3; and Fig. 4 represents a bottom view of Fig. 1.

The faucet is shown with the casing 20 that has formed therewith the discharging spout 22 at its front end 23. In the central portion of the casing is formed an opening 24 with the side guide faces 25, and top guide faces 26 are formed in the casing 20 on opposite sides of the said guide therein.

A tubular valve 28 is guided in the casing 20. A clamp is indicated with the jaws 29 and shank 30. A pin 31 is in threaded engagement with said shank. The guide cap 32 is supported on the top of the shank 30 and is clamped thereto by means of the clamping nut 33. A handle 34 on the pin 31 bears on the nut 33 and is held in place by the cap nut 35. The jaws 29 are clamped to the tubular valve 28 by means of the screw 36. A stuffing box 45 is formed in the casing 20 and has shown therein the packing 46. A ring 47 bears against the packing 46 and a spiral spring 48 bears with one end against said ring.

A cap for rear end of the casing is indicated at 50, which has formed therewith the threaded inlet nozzle 51 and the threaded sleeve 52. The spring 48 is supported at its outer end in the sleeve 52. The threaded sleeve 52 is in threaded engagement with the rear portion of the casing 20. In the front end of the casing is shown a stuffing box 55 with the packing 56. A ring 57 bears against the packing 56, and a spring 58, bears with one end against said ring 57. A gland 60 with a discharge port 61 is held in the front end 23, of the casing 20, by means of the screw 63. The said gland bears against its spring 58.

A screw cap 64 is in threaded engagement with the front end 23, and carries a rubber disk 65 against which the front end of the tubular valve 28 can bear.

To operate the invention the operator pushes the handle 34 forward to the position shown in Figs. 1 and 2 which locates the tubular valve 28 in its closed position, over the discharge port 61. To open the faucet the handle 34 is pushed to the rear in the direction of the arrow A and thereby the port 61 is uncovered and the fluid can then flow through the inlet nozzle 51, tubular valve 28, port 61 and be discharged from the discharge spout 22.

It will be noted that the sides of the shank 30 parallel to the longitudinal axis of the faucet contact, with the guide faces 25, and the cap 32 contacts with the guide faces 26 to avoid any tipping of the shank 30 and consequently any tipping of the valve 28 when it is reciprocated.

Having described my invention what I desire to secure by Letters Patent and claim is:

1. In a faucet the combination of a casing having an opening in the central portion thereof, the said opening having side guide faces and top guide faces formed therewith, a spout at the front end of the casing, an inlet nozzle at the other end of the casing, a tubular valve slidably supported in the casing, a clamp located in said opening rigidly clamping said valve, a shank for the clamp contacting with the said side guide faces, a guide cap supported on the shank contacting with said top guide faces, and a handle for said clamp to reciprocate said valve with the reciprocations of the handle.

2. In a faucet of the character described the combination of a casing having an opening in the central portion thereof, a spout at the front end of the casing, a tubular valve slidably supported in the casing, stuffing boxes in the casing at opposite ends of the opening therein, a spring in each stuffing box to maintain the packing therein in proper position, an inlet nozzle in threaded engagement with the rear end of the casing having a threaded sleeve which bears against the spring at the rear end of the casing, a gland with a discharge port in the front end of the casing bearing against the spring in the front end of the casing, a cap in threaded engagement with the front end of the casing and having a pliable disk for the front end of the tubular valve to bear against when the latter is moved to its closed position, a clamp in the opening in the casing rigidly clamped to the tubular valve and a handle connected to said clamp.

Signed at Jersey City in the county of Hudson and State of New Jersey this 6th day of November A. D. 1915.

HARRY E. SCHEID.

Witnesses:
A. A. DE BONNEVILLE,
RALPH E. SLAYTON.

Copies of this patent may be obtained for five cents each, by addressing the "Commissioner of Patents, Washington, D. C."